(12) United States Patent
Hahn

(10) Patent No.: US 10,746,164 B2
(45) Date of Patent: Aug. 18, 2020

(54) LINEAR COMPRESSOR WITH A COUPLING

(71) Applicant: Haier US Appliance Solutions, Inc., Wilmington, DE (US)

(72) Inventor: Gregory William Hahn, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 121 days.

(21) Appl. No.: 15/975,823

(22) Filed: May 10, 2018

(65) Prior Publication Data

US 2019/0345924 A1 Nov. 14, 2019

(51) Int. Cl.
*F04B 39/00* (2006.01)
*F04B 35/04* (2006.01)
*F16J 1/22* (2006.01)

(52) U.S. Cl.
CPC ........ *F04B 39/0005* (2013.01); *F04B 35/045* (2013.01); *F16J 1/22* (2013.01); *F04B 35/04* (2013.01); *F04B 39/0016* (2013.01)

(58) Field of Classification Search
CPC ........ F04B 35/04; F04B 53/002; F04B 53/14; F04B 37/18; F04B 39/0044; F04B 39/0005; F04B 39/0016; F16J 1/22
See application file for complete search history.

(56) References Cited

U.S. PATENT DOCUMENTS

| | | | | |
|---|---|---|---|---|
| 2,500,669 A | * | 3/1950 | Doeg | F04B 39/0005 403/144 |
| 2,791,969 A | * | 5/1957 | Berliner | F04B 43/084 417/571 |
| 6,506,032 B2 | | 1/2003 | Kawahara et al. | |
| 7,316,547 B2 | | 1/2008 | Lilie | |
| 7,614,856 B2 | | 11/2009 | Inagaki et al. | |
| 8,562,311 B2 | * | 10/2013 | Boyd, Jr. | F04B 35/045 417/417 |
| 8,684,706 B2 | | 4/2014 | McGill | |
| 10,066,615 B2 | * | 9/2018 | Hahn | F04B 39/005 |
| 10,100,819 B2 | * | 10/2018 | Hahn | F04B 39/0022 |
| 10,221,842 B2 | * | 3/2019 | Lilie | F04B 39/0005 |
| 2017/0211562 A1 | | 7/2017 | Hahn et al. | |

FOREIGN PATENT DOCUMENTS

JP 2004011496 A * 1/2004

* cited by examiner

*Primary Examiner* — Nathan C Zollinger
(74) *Attorney, Agent, or Firm* — Dority & Manning, P.A.

(57) ABSTRACT

A linear compressor includes a piston with a piston head and a cylindrical side wall. An inner surface of the cylindrical side wall defines a ball seat. A coupling extends between a mover and a piston. The coupling includes a flex mount that extends between a first end portion and a second end portion. The flex mount is connected to the mover away from the first end portion of the flex mount. A ball nose is positioned at the first end portion of the flex mount. The ball nose contacts the piston at the ball seat of the piston. A spring urges the ball nose against the ball seat of the piston.

19 Claims, 4 Drawing Sheets

LINEAR COMPRESSOR WITH A COUPLING

FIELD OF THE INVENTION

The present subject matter relates generally to linear compressors and couplings for linear compressors.

BACKGROUND OF THE INVENTION

Certain refrigerator appliances include sealed systems for cooling chilled chambers of the refrigerator appliance. The sealed systems generally include a compressor that generates compressed refrigerant during operation of the sealed system. The compressed refrigerant flows to an evaporator where heat exchange between the chilled chambers and the refrigerant cools the chilled chambers and food items located therein.

Recently, certain refrigerator appliances have included linear compressors for compressing refrigerant. Linear compressors generally include a piston and a driving coil. The driving coil generates a force for sliding the piston forward and backward within a chamber. During motion of the piston within the chamber, the piston compresses refrigerant. However, friction between the piston and a wall of the chamber can negatively affect operation of the linear compressors if the piston is not suitably aligned within the chamber. In particular, friction losses due to rubbing of the piston against the wall of the chamber can negatively affect an efficiency of an associated refrigerator appliance.

Accordingly, a linear compressor with features for limiting friction between a piston and a wall of a cylinder during operation of the linear compressor would be useful.

BRIEF DESCRIPTION OF THE INVENTION

Aspects and advantages of the invention will be set forth in part in the following description, or may be apparent from the description, or may be learned through practice of the invention.

In a first example embodiment, a linear compressor includes a driving coil. A mover is positioned adjacent the driving coil. The driving coil is operable to reciprocate the mover relative to the driving coil. A piston has a piston head and a cylindrical side wall. An inner surface of the cylindrical side wall defines a ball seat. A coupling extends between the mover and the piston. The coupling includes a flex mount that extends between a first end portion and a second end portion. The flex mount is connected to the mover away from the first end portion of the flex mount. A ball nose is positioned at the first end portion of the flex mount. The ball nose contacts the piston at the ball seat of the piston. A post extends from the piston into the flex mount. A spring is coupled to the post and the flex mount such that the spring urges the ball nose against the ball seat of the piston.

In a second example embodiment, a linear compressor includes a driving coil. A mover is positioned adjacent the driving coil. The driving coil is operable to reciprocate the mover relative to the driving coil. A piston has a piston head and a cylindrical side wall. An inner surface of the cylindrical side wall defines a ball seat. A coupling extends between the mover and the piston. The coupling includes a flex mount extending between a first end portion and a second end portion. The flex mount is connected to the mover away from the first end portion of the flex mount. The flex mount has an annular flange at the first end portion of the flex mount. A ball nose is positioned at the first end portion of the flex mount. The ball nose has a frusto-spherical surface positioned against the ball seat of the piston. The ball seat is shaped complementary to the frusto-spherical surface of the ball nose. The ball nose also has an annular flange. The annular flange of the ball nose is positioned concentrically with the annular flange of the flex mount. A post extends from the piston into the flex mount. A spring is coupled to the post and the flex mount such that the spring compresses the ball nose between the flex mount and the ball seat of the piston. A radial gap is defined between the annular flange of the ball nose and the annular flange of the flex mount such that the ball nose is radially movable relative to the flex mount.

In a third example embodiment, a linear compressor includes a driving coil. A mover is positioned adjacent the driving coil. The driving coil is operable to reciprocate the mover relative to the driving coil. A piston has a piston head and a cylindrical side wall. An inner surface of the cylindrical side wall defines a ball seat. A coupling extends between the mover and the piston. The coupling includes a flex mount that extends between a first end portion and a second end portion. The flex mount is connected to the mover away from the first end portion of the flex mount. A ball nose is positioned at the first end portion of the flex mount. The ball nose contacts the piston at the ball seat of the piston.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
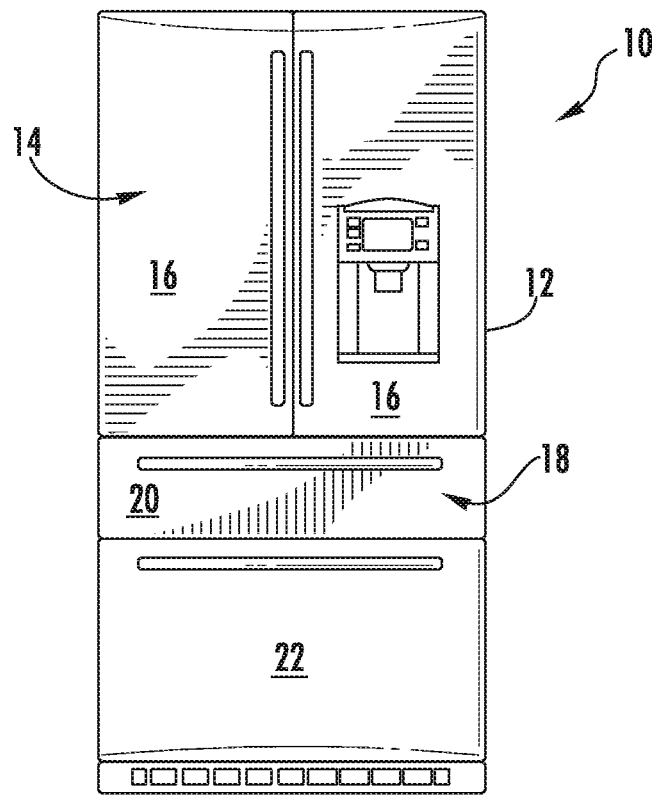
FIG. 1 is a front elevation view of a refrigerator appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
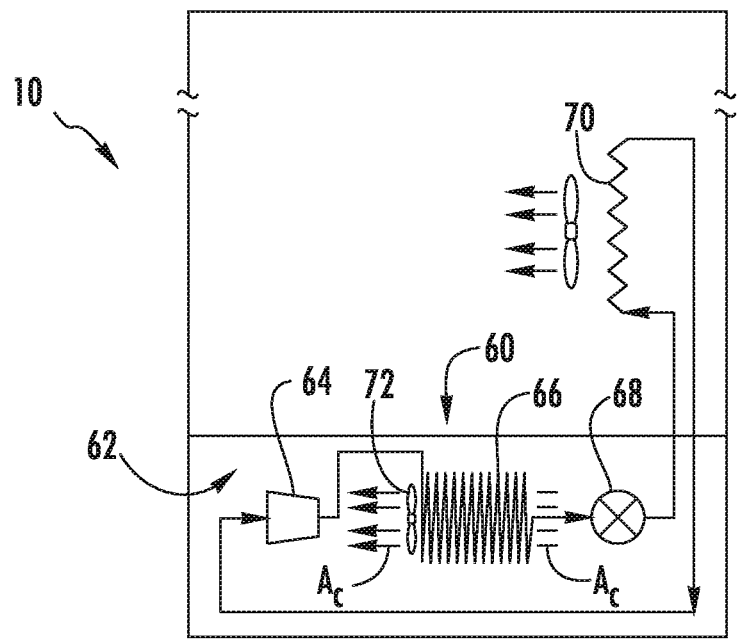
FIG. 2 is schematic view of certain components of the example refrigerator appliance of FIG. 1.

FIG. 1 depicts a refrigerator appliance 10 that incorporates a sealed refrigeration system 60 (FIG. 2). It should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

In the illustrated example embodiment shown in FIG. 1, the refrigerator appliance 10 is depicted as an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

FIG. 2 is a schematic view of certain components of refrigerator appliance 10, including a sealed refrigeration system 60 of refrigerator appliance 10. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device (e.g., a valve, capillary tube, or other restriction device) 68 receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well.

Figure 3:
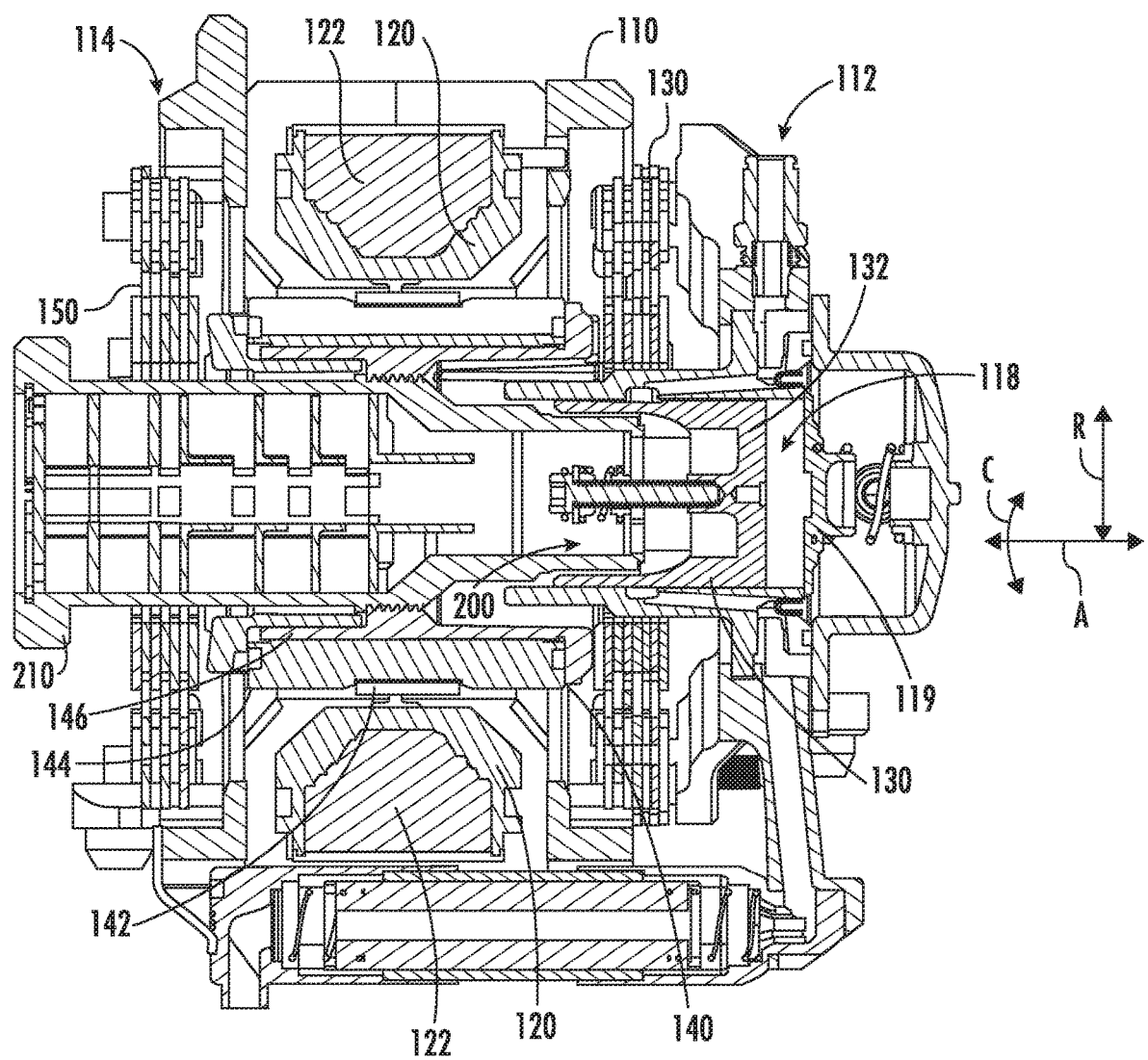
FIG. 3 is a section view of a linear compressor according to an example embodiment of the present subject matter.

FIG. 3 is a section view of a linear compressor 100 according to an exemplary embodiment of the present subject matter. As discussed in greater detail below, linear compressor 100 is operable to increase a pressure of fluid within a chamber 118 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2). As may be seen in FIG. 3, linear compressor 100 defines an axial direction A, a radial direction R and a circumferential direction C. Linear compressor 100 may be enclosed within a hermetic or air-tight shell (not shown). The hermetic shell can, e.g., hinder or prevent refrigerant from leaking or escaping from refrigeration system 60.

Turning now to FIG. 3, linear compressor 100 includes a casing 110 that extends between a first end portion 112 and a second end portion 114, e.g., along the axial direction A. Casing 110 includes various static or non-moving structural components of linear compressor 100. In particular, casing 110 includes a cylinder 116 that defines a chamber 118. Cylinder 116 is positioned at or adjacent first end portion 112 of casing 110. Chamber 118 extends longitudinally along the axial direction A. A stator, e.g., including an outer back iron 120 and a driving coil 122, of a motor is mounted or secured to casing 110. Linear compressor 100 also includes valves (such as a discharge valve 119 at an end of chamber 118) that permit refrigerant to enter and exit chamber 118 during operation of linear compressor 100.

A piston 130 with a piston head 132 is slidably received within chamber 118 of cylinder 116. In particular, piston 130 is slidable along the axial direction A. During sliding of piston head 132 within chamber 118, piston head 132 compresses refrigerant within chamber 118. As an example, from a top dead center position, piston head 132 can slide within chamber 118 towards a bottom dead center position along the axial direction A, i.e., an expansion stroke of piston head 132. When piston head 132 reaches the bottom dead center position, piston head 132 changes directions and slides in chamber 118 back towards the top dead center position, i.e., a compression stroke of piston head 132. It should be understood that linear compressor 100 may include an additional piston head and/or additional chamber at an opposite end of linear compressor 100. Thus, linear compressor 100 may have multiple piston heads in alternative exemplary embodiments.

As may be seen in FIG. 3, linear compressor 100 also includes a mover, such as an inner back iron 140. Inner back iron 140 is positioned in the stator of the motor. In particular, outer back iron 120 and/or driving coil 122 may extend about inner back iron 140, e.g., along the circumferential direction C. Inner back iron 140 also has an outer surface that faces towards outer back iron 120 and/or driving coil 122. At least one driving magnet 142 is mounted to inner back iron 140, e.g., at the outer surface of inner back iron 140. Driving magnet 142 may face and/or be exposed to driving coil 122. In particular, driving magnet 142 may be spaced apart from driving coil 122, e.g., along the radial direction R by an air gap. Thus, the air gap may be defined between opposing surfaces of driving magnet 142 and driving coil 122. Driving magnet 142 may also be mounted or fixed to inner back iron 140 such that an outer surface of driving magnet 142 is substantially flush with the outer surface of inner back iron 140. Thus, driving magnet 142 may be inset within inner back iron 140. In such a manner, the magnetic field from driving coil 122 may have to pass through only a single air gap between outer back iron 120 and inner back iron 140 during operation of linear compressor 100, and linear compressor 100 may be more efficient relative to linear compressors with air gaps on both sides of a driving magnet.

As may be seen in FIG. 3, driving coil 122 extends about inner back iron 140, e.g., along the circumferential direction C. In alternative example embodiments, inner back iron 140 may extend around driving coil 122 along the circumferential direction C. Driving coil 122 is operable to move the inner back iron 140 along the axial direction A during operation of driving coil 122. As an example, a current may be induced within driving coil 122 by a current source (not shown) to generate a magnetic field that engages driving magnet 142 and urges piston 130 to move along the axial direction A in order to compress refrigerant within chamber 118 as described above and will be understood by those skilled in the art. In particular, the magnetic field of driving coil 122 may engage driving magnet 142 in order to move inner back iron 140 and piston head 132 along the axial direction A during operation of driving coil 122. Thus, driving coil 122 may slide piston 130 between the top dead center position and the bottom dead center position, e.g., by moving inner back iron 140 along the axial direction A, during operation of driving coil 122.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 122 of the motor. Thus, the controller may selectively activate driving coil 122, e.g., by inducing current in driving coil 122, in order to compress refrigerant with piston 130 as described above.

The controller includes memory and one or more processing devices such as microprocessors, CPUs or the like, such as general or special purpose microprocessors operable to execute programming instructions or micro-control code associated with operation of linear compressor 100. The memory can represent random access memory such as DRAM, or read only memory such as ROM or FLASH. The processor executes programming instructions stored in the memory. The memory can be a separate component from the processor or can be included onboard within the processor. Alternatively, the controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Linear compressor 100 also includes a pair of planar springs 150. Each planar spring 150 may be coupled to a respective end of inner back iron 140, e.g., along the axial direction A. During operation of driving coil 122, planar springs 150 support inner back iron 140. In particular, inner back iron 140 is suspended by planar springs 150 within the stator or the motor of linear compressor 100 such that motion of inner back iron 140 along the radial direction R is hindered or limited while motion along the axial direction A is relatively unimpeded. Thus, planar springs 150 may be substantially stiffer along the radial direction R than along the axial direction A. In such a manner, planar springs 150 can assist with maintaining a uniformity of the air gap between driving magnet 142 and driving coil 122, e.g., along the radial direction R, during operation of the motor and movement of inner back iron 140 on the axial direction A. Planar springs 150 can also assist with hindering side pull forces of the motor from transmitting to piston 130 and being reacted in cylinder 116 as a friction loss.

Inner back iron 140 includes an outer cylinder 144 and an inner sleeve 146. Outer cylinder 144 defines the outer surface of inner back iron 140 and also has an inner surface 143 positioned opposite the outer surface of outer cylinder 144. Inner sleeve 146 is positioned on or at inner surface 143 of outer cylinder 144. A first interference fit between outer cylinder 144 and inner sleeve 146 may couple or secure outer cylinder 144 and inner sleeve 146 together. In alternative exemplary embodiments, inner sleeve 146 may be welded, glued, fastened, or connected via any other suitable mechanism or method to outer cylinder 144.

Outer cylinder 144 may be constructed of or with any suitable material. For example, outer cylinder 144 may be constructed of or with a plurality of (e.g., ferromagnetic) laminations. The laminations are distributed along the circumferential direction C in order to form outer cylinder 144 and are mounted to one another or secured together, e.g., with rings pressed onto ends of the laminations. Outer cylinder 144 defines a recess that extends inwardly from the outer surface of outer cylinder 144, e.g., along the radial direction R. Driving magnet 142 is positioned in the recess on outer cylinder 144, e.g., such that driving magnet 142 is inset within outer cylinder 144.

A flex mount 210 is mounted to and extends through inner back iron 140. In particular, flex mount 210 is mounted to inner back iron 140 via inner sleeve 146. Thus, flex mount 210 may be coupled (e.g., threaded) to inner sleeve 146 at the middle portion of inner sleeve 146 and/or flex mount 210 in order to mount or fix flex mount 210 to inner sleeve 146. Flex mount 210 may assist with forming a coupling 200. Coupling 200 connects inner back iron 140 and piston 130 such that motion of inner back iron 140, e.g., along the axial direction A, is transferred to piston 130.

Coupling 200 may be a compliant coupling that is compliant or flexible along the radial direction R. In particular, coupling 200 may be sufficiently compliant along the radial direction R such that little or no motion of inner back iron 140 along the radial direction R is transferred to piston 130 by coupling 200. In such a manner, side pull forces of the motor are decoupled from piston 130 and/or cylinder 116 and friction between piston 130 and cylinder 116 may be reduced.

Figure 4:
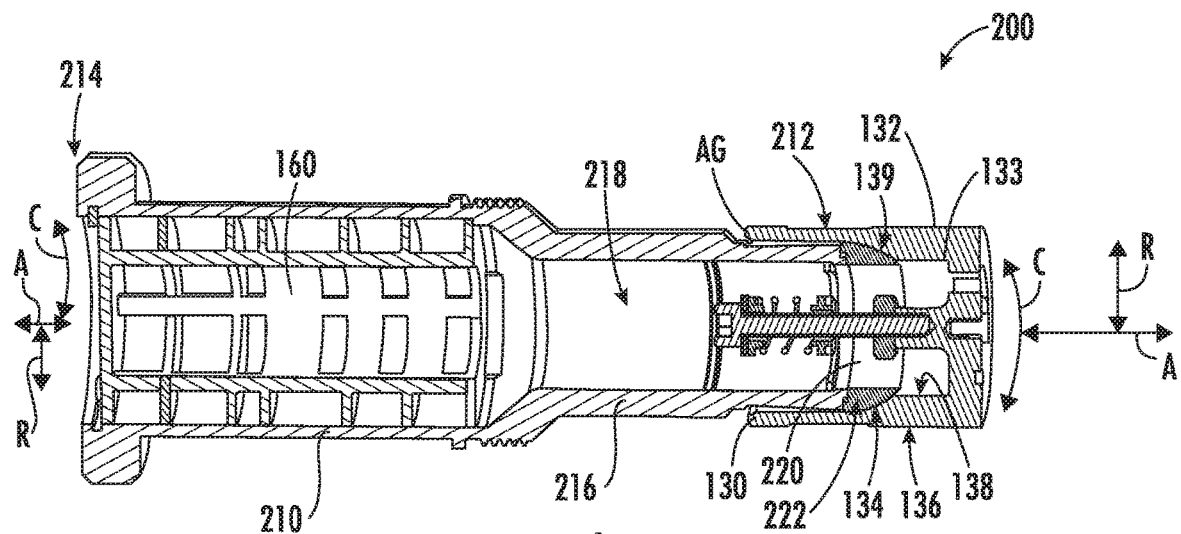
FIG. 4 is a section view of a coupling of the example liner compressor of FIG. 3.
Figure 5:
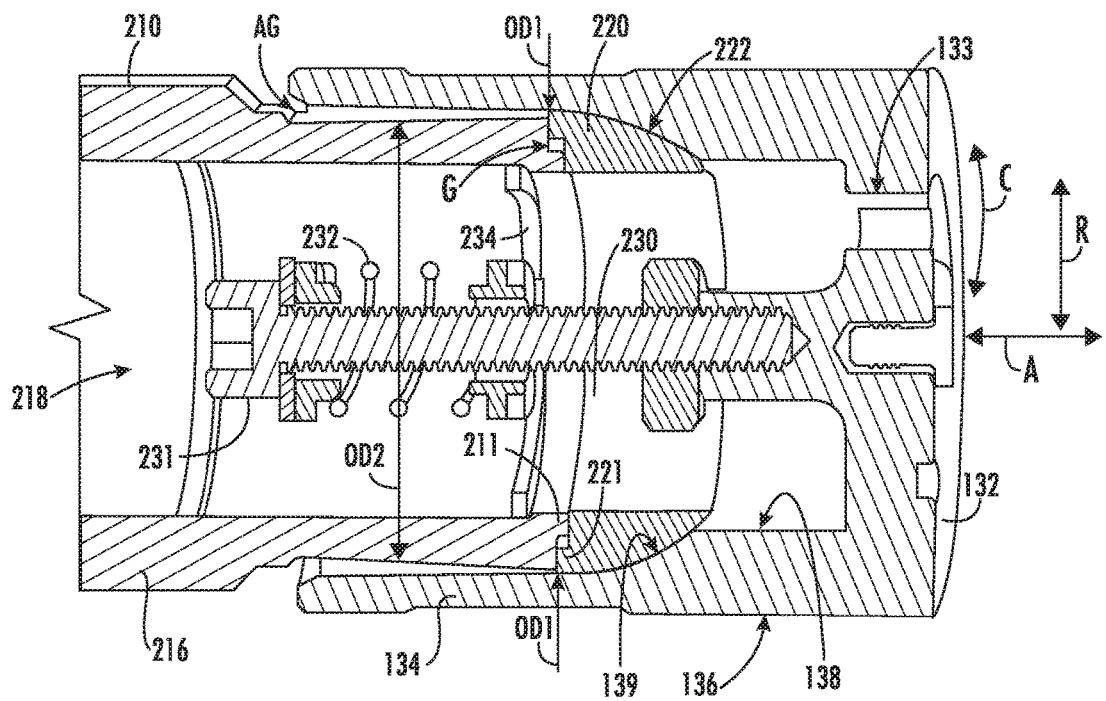
FIG. 5 is a partial, section view of certain components of the coupling of FIG. 4.
Figure 6:
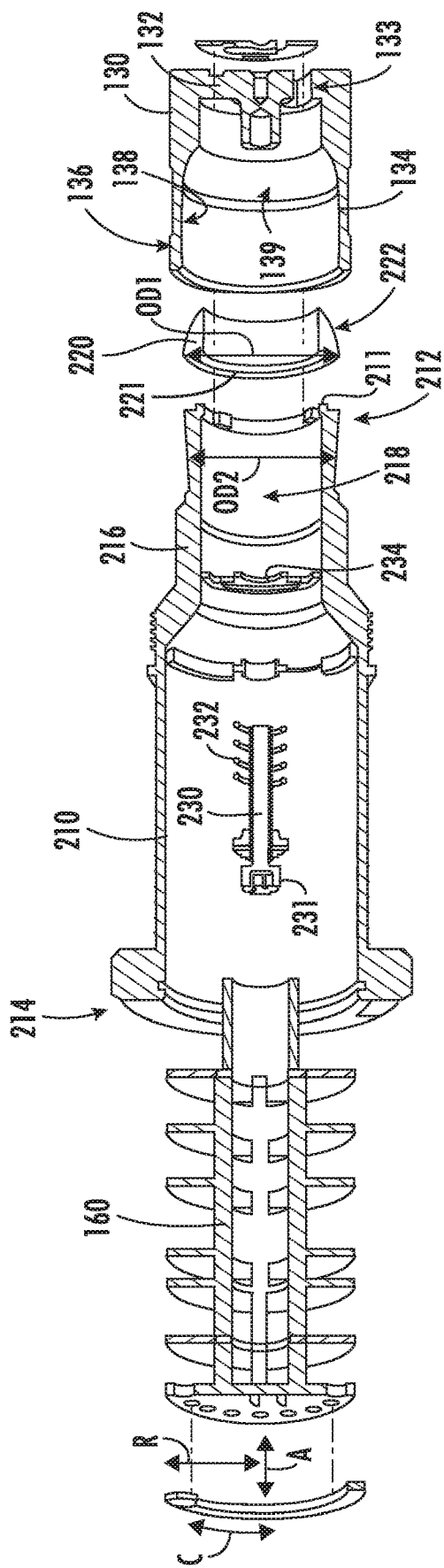
FIG. 6 is an exploded, section view of the coupling of FIG. 4.

FIG. 4 is a section view of coupling 200, and FIG. 6 is an exploded, section view of coupling 200. FIG. 5 is a partial, section view of certain components of coupling 200. As may be seen in FIGS. 4 through 6, piston 130 has a piston head 132 and a cylindrical side wall 134. Cylindrical side wall 134 may extend along the axial direction A from piston head 132 towards inner back iron 140. An outer surface 136 of cylindrical side wall 134 may slide on cylinder 116 at chamber 118. An inner surface 138 of cylindrical side wall 134 is positioned opposite outer surface 136 of cylindrical side wall 134. Thus, outer surface 136 of cylindrical side wall 134 may face away from a center of cylindrical side wall 134 along the radial direction R, and inner surface 138 of cylindrical side wall 134 may face towards the center of cylindrical side wall 134 along the radial direction R. Inner surface 138 of cylindrical side wall 134 defines a ball seat 139.

Flex mount 210 extends between a first end portion 212 and a second end portion 214, e.g., along the axial direction A. Flex mount 210 is connected to inner back iron 140 away from first end portion 212 of flex mount 210. For example, flex mount 210 may be connected to inner back iron 140 at second end portion 214 of flex mount 210 or between first and second end portions 212, 214 of flex mount 210. Conversely, flex mount 210 is positioned at or within piston 130 at first end portion 212 of flex mount 210, as discussed in greater detail below.

Flex mount 210 includes a tubular wall 216 between inner back iron 140 and piston 130. A channel 218 within tubular wall 216 is configured for directing compressible fluid, such as refrigerant or air, though flex mount 210 towards piston head 132 and/or into piston 130. Inner back iron 140 may be mounted to flex mount 210 such that inner back iron 140 extends around tubular wall 216, e.g., at the middle portion of flex mount 210 between first and second end portions 212, 214 of flex mount 210. Channel 218 may extend between first and second end portions 212, 214 of flex mount 210 within tubular wall 216 such that the compressible fluid is flowable from first end portion 212 of flex mount 210 to second end portion 214 of flex mount 210 through channel 218. In such a manner, compressible fluid may flow through inner back iron 140 within flex mount 210 during operation of linear compressor 100. A muffler 160 may be positioned within channel 218 within tubular wall 216. Muffler 160 reduces the noise of compressible fluid flowing through channel 218.

Piston head 132 also defines at least one opening 133. Opening 133 of piston head 132 extends, e.g., along the axial direction A, through piston head 132. Thus, the flow of fluid may pass through piston head 132 via opening 133 of piston head 132 into chamber 118 during operation of linear compressor 100. In such a manner, the flow of fluid (that is compressed by piston head 132 within chamber 118) may flow within channel 218 through flex mount 210 and inner back iron 140 to piston 130 during operation of linear compressor 100. A valve 135 on piston head 132 regulates the flow of compressible fluid through opening 133 into chamber 118.

Coupling 200 also includes a ball nose 220. Ball nose 220 is positioned at first end portion 212 of flex mount 210, and ball nose 220 may contact flex mount 210 at first end portion 212 of flex mount 210. In addition, ball nose 220 may contact piston 130 at ball seat 139 of piston 130. In particular, ball nose 220 may rest on ball seat 139 of piston 130 such that ball nose 220 is slidable and/or rotatable on ball seat 139 of piston 130. For example, ball nose 220 may have a frusto-spherical surface 222 positioned against ball seat 139 of piston 130, and ball seat 139 may be shaped complementary to frusto-spherical surface 222 of ball nose 220. Frusto-spherical surface 222 of ball nose 220 may slide and/or rotate on ball seat 139 of piston 130.

Relative motion between flex mount 210 and piston 130 at the interface between ball nose 220 and ball seat 139 of piston 130 may provide reduced friction between piston 130 and cylinder 116, e.g., compared to a fixed connection between flex mount 210 and piston 130. For example, when an axis on which piston 130 slides within cylinder 116 is angled relative to the axis on which inner back iron 140 reciprocates, frusto-spherical surface 222 of ball nose 220 may slide on ball seat 139 of piston 130 to reduce friction between piston 130 and cylinder 116 relative to a rigid connection between inner back iron 140 and piston 130.

As shown in FIG. 5, flex mount 210 has an annular flange 211 at first end portion 212 of flex mount 210. Ball nose 220 also has an annular flange 221. Annular flange 221 of ball nose 220 is positioned concentrically with annular flange 211 of flex mount 210. For example, annular flange 211 of flex mount 210 may be positioned within annular flange 221 of ball nose 220, e.g., along the radial direction R. In alternative example embodiments, annular flange 221 of ball nose 220 may be positioned within annular flange 211 of flex mount 210, e.g., along the radial direction R, in alternative example embodiments.

A radial gap G is defined between annular flange 221 of ball nose 220 and annular flange 211 of flex mount 210. For example, in FIG. 5, an outer diameter of annular flange 221 of ball nose 220 faces an inner diameter of annular flange 211 of flex mount 210, e.g., along the radial direction R. The outer diameter of annular flange 221 of ball nose 220 may be larger than the inner diameter of annular flange 211 of flex mount 210, e.g., by no less than one millimeter (1 mm).

The radial gap G allows ball nose 220 to move, e.g., along the radial direction R, relative to flex mount 210. Movement of ball nose 220, e.g., along the radial direction R, relative to flex mount 210 can assist with reducing friction between piston 130 and cylinder 116 relative to a rigid connection between inner back iron 140 and piston 130. For example, when the axis on which piston 130 slides within cylinder 116 is offset along the radial direction R relative to the axis on which inner back iron 140 reciprocates, the radial gap G allows ball nose 220 to move along the radial direction R relative to flex mount 210 to reduce friction between piston 130 and cylinder 116 comparted to a rigid connection between inner back iron 140 and piston 130. An outer diameter OD1 of ball nose 220 may also be greater than an outer diameter OD2 of flex mount 210, e.g., at first end portion 212 of flex mount 210, e.g., such that flex mount 210 does not contact cylindrical side wall 134.

Coupling 200 also includes features for mounting ball nose 220 to flex mount 210. In particular, coupling 200 includes a post 230 extending from piston 130 into flex mount 210 at first end portion 212 of flex mount 210. A spring 232 is coupled to post 230 and flex mount 210. Spring 232 urges ball nose 220 against ball seat 139 of piston 130. In particular, spring 232 may compress ball nose 220 between flex mount 210 and ball seat 139 of piston 130, e.g., by pulling piston 130 towards ball nose 220 and flex mount 210, along the axial direction A. Spring 232 may be pre-loaded to hold coupling 200 together (and avoid knocking during oscillations of piston 130) while also allowing sufficient radial flexibility to allow the interface between ball nose 220 and ball seat 139 of piston 130 to move under low friction.

A pre-load ring 234 may be positioned within flex mount 210 at first end portion 212 of flex mount 210. A head 231 of post 230 may be positioned opposite piston head 132 of piston 130 about pre-load ring 230. Post 230 may be threaded to piston head 132 of piston 130 and may extend through pre-load ring 234 along the axial direction A. In particular, post 230 may extend along the axial direction A from piston head 132 of piston 130 through pre-load ring 234. Spring 232 may be compressed between head 231 of post 230 and pre-load ring 234, e.g., such that spring 232 urges ball nose 220 against ball seat 139 of piston 130.

As noted above, tubular wall 216 of flex mount 210 extends between inner back iron 140 and piston 130, e.g., along the axial direction A. Cylindrical side wall 134 of piston 130 extends around tubular wall 216 at first end portion 212 of flex mount 210. An annular gap AG is defined between cylindrical side wall 134 of piston 130 and tubular wall 216 of flex mount 210. Oil is flowable through the annular gap AG to the interface between ball nose 220 and ball seat 139 of piston 130. In such a manner, the interface between ball nose 220 and ball seat 139 of piston 130 may be lubricated by oil to decrease friction between ball nose 220 and ball seat 139 of piston 130. However, the interface between ball nose 220 and ball seat 139 of piston 130 may also prevent copious volumes of oil from flowing into channel 218 and thus into chamber 118.

Flex mount 210 and ball nose 220 may each be constructed of or with suitable plastic, such as a thermoplastic. In certain example embodiments, flex mount 210 and/or ball nose 220 may be constructed of or with polybutylene terephthalate. Ball nose 220 may also be impregnated with glass fibers to assist ball nose 220 with holding up to dynamic loading. As another example, ball nose 220 may be constructed of or with Teflon® or molybdenum to decrease friction between ball nose 220 and ball seat 139 of piston 130.

Coupling 200 provides may be manufactured at low cost and high volume relative to known couplings. For example, ball seat 139 may be CNC machined into piston 130 with sufficient finish and accuracy to avoid further required finishing as with known ball joints that require grinding and polishing. Ball nose 220 may also be injection molded with adequate finish and accuracy. In addition, coupling 200 may connect back iron 140 to piston 130 with one ball joint as comparted to known couplings with two ball joints.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A linear compressor, comprising:
   a driving coil;
   a mover positioned adjacent the driving coil, the driving coil operable to reciprocate the mover relative to the driving coil;
   a piston having a piston head and a cylindrical side wall, an inner surface of the cylindrical side wall defining a ball seat; and
   a coupling extending between the mover and the piston, the coupling comprising
      a flex mount extending between a first end portion and a second end portion, the flex mount connected to the mover away from the first end portion of the flex mount;
      a ball nose positioned at the first end portion of the flex mount, the ball nose contacting the piston at the ball seat of the piston;
      a post extending from the piston into the flex mount; and
      a spring coupled to the post and the flex mount such that the spring urges the ball nose against the ball seat of the piston.

2. The linear compressor of claim 1, wherein the flex mount comprises a tubular wall between the mover and the piston, a channel within the tubular wall configured for directing refrigerant though the flex mount towards the piston head of the piston.

3. The linear compressor of claim 2, wherein the mover is mounted to the flex mount such that the mover extends around the tubular wall.

4. The linear compressor of claim 3, wherein the channel extends between the first and second end portions of the flex mount within the tubular wall such that the refrigerant is flowable from the first end portion of the flex mount to the second end portion of the flex mount through the channel.

5. The linear compressor of claim 4, wherein the coupling further comprises a muffler positioned within the tubular wall.

6. The linear compressor of claim 1, wherein the flex mount and the ball nose are constructed with one or more thermoplastics.

7. The linear compressor of claim 1, wherein the flex mount is constructed of a thermoplastic impregnated with glass fibers.

8. The linear compressor of claim 1, wherein the ball nose has a frusto-spherical surface positioned against the ball seat of the piston, and the ball seat is shaped complementary to the frusto-spherical surface of the ball nose.

9. The linear compressor of claim 1, wherein the flex mount comprises a tubular wall between the mover and the piston, the cylindrical side wall of the piston extending around the tubular wall of the flex mount at the first end portion of the flex mount such that an annular gap is defined between the cylindrical side wall of the piston and the tubular wall of the flex mount, and oil is flowable through the annular gap to an interface between the ball nose and the ball seat of the piston.

10. The linear compressor of claim 1, wherein the flex mount has an annular flange at the first end portion of the flex mount, the ball nose has an annular flange, and the annular flange of the ball nose is positioned concentrically with the annular flange of the flex mount.

11. The linear compressor of claim 10, wherein a radial gap is defined between the annular flange of the ball nose and the annular flange of the flex mount such that the ball nose is radially movable relative to the flex mount.

12. The linear compressor of claim 10, wherein the spring compresses the ball nose between the flex mount and the ball seat of the piston.

13. The linear compressor of claim 1, wherein the coupling further comprises a pre-load ring positioned within the flex mount at the first end portion of the flex mount, a head of the post is positioned opposite the piston head of the piston about the pre-load ring, the post is threaded to the piston head of the piston and extends through the pre-load ring, and the spring is compressed between the head of the post and the pre-load ring.

14. A linear compressor, comprising:
   a driving coil;
   a mover positioned adjacent the driving coil, the driving coil operable to reciprocate the mover relative to the driving coil;
   a piston having a piston head and a cylindrical side wall, an inner surface of the cylindrical side wall defining a ball seat; and
   a coupling extending between the mover and the piston, the coupling comprising
      a flex mount extending between a first end portion and a second end portion, the flex mount connected to the mover away from the first end portion of the flex mount, the flex mount having an annular flange at the first end portion of the flex mount;
      a ball nose positioned at the first end portion of the flex mount, the ball nose having a frusto-spherical surface positioned against the ball seat of the piston, the ball seat shaped complementary to the frusto-spherical surface of the ball nose, the ball nose having an annular flange, the annular flange of the ball nose positioned concentrically with the annular flange of the flex mount;

a post extending from the piston into the flex mount; and a spring coupled to the post and the flex mount such that the spring compresses the ball nose between the flex mount and the ball seat of the piston, and wherein a radial gap is defined between the annular flange of the ball nose and the annular flange of the flex mount such that the ball nose is radially movable relative to the flex mount.

15. The linear compressor of claim 14, wherein the flex mount comprises a tubular wall between the mover and the piston, a channel within the tubular wall configured for directing refrigerant though the flex mount towards the piston head of the piston.

16. The linear compressor of claim 15, wherein the mover is mounted to the flex mount such that the mover extends around the tubular wall.

17. The linear compressor of claim 16, wherein the channel extends between the first and second end portions of the flex mount within the tubular wall such that the refrigerant is flowable from the first end portion of the flex mount to the second end portion of the flex mount through the channel.

18. The linear compressor of claim 17, wherein the coupling further comprises a muffler positioned within the tubular wall.

19. The linear compressor of claim 14, wherein the flex mount comprises a tubular wall between the mover and the piston, the cylindrical side wall of the piston extending around the tubular wall of the flex mount at the first end portion of the flex mount such that an annular gap is defined between the cylindrical side wall of the piston and the tubular wall of the flex mount, and oil is flowable through the annular gap to an interface between the ball nose and the ball seat of the piston.

* * * * *